(12) United States Patent
Gopakumar et al.

(10) Patent No.: US 8,904,244 B2
(45) Date of Patent: Dec. 2, 2014

(54) HEURISTIC APPROACH FOR FASTER CONSISTENCY CHECK IN A REDUNDANT STORAGE SYSTEM

(71) Applicant: LSI Corporation, Milpitas, CA (US)

(72) Inventors: Manjusha Gopakumar, Bangalore (IN); Ankit Goel, Bangalore (IN)

(*) Notice: Subject to any disclaimer, the term of this patent is extended or adjusted under 35 U.S.C. 154(b) by 183 days.

(21) Appl. No.: 13/653,885

(22) Filed: Oct. 17, 2012

(65) Prior Publication Data

US 2014/0108855 A1   Apr. 17, 2014

(51) Int. Cl.
*G06F 11/00*   (2006.01)
(52) U.S. Cl.
USPC ............................................ 714/48
(58) Field of Classification Search
CPC ............ G06F 11/0793; G06F 11/0709; G06F 11/0772; G06F 11/0781; G06F 11/2094; G06F 11/1076; G06F 11/1662; G06F 11/1008
USPC .................................... 714/48, 6.2
See application file for complete search history.

(56) References Cited

U.S. PATENT DOCUMENTS

| | | | | |
|---|---|---|---|---|
| 6,161,192 A | * | 12/2000 | Lubbers et al. | 714/6.21 |
| 2008/0155316 A1 | * | 6/2008 | Pawar et al. | 714/8 |
| 2010/0037091 A1 | * | 2/2010 | Baderdinni et al. | 714/6 |
| 2013/0111299 A1 | * | 5/2013 | Hashimoto et al. | 714/758 |

* cited by examiner

*Primary Examiner* — Yair Leibovich
(74) *Attorney, Agent, or Firm* — Duft Bornsen & Fettig LLP

(57) ABSTRACT

A method for reducing an amount of time required for performing consistency checking in a redundant storage system includes steps of: providing an information repository associated with each of a primary drive and at least one redundant drive; storing, in the information repository, information relating to input/output failures on the primary drive and redundant drive; determining a likelihood that one or more regions of the primary drive and/or redundant drive contains inconsistent data as a function of the information stored in the information repository; and performing consistency checking on the one or more regions of the primary drive and the redundant drive determined to have at least a prescribed likelihood of containing inconsistent data to thereby reduce the amount of time required for performing consistency checking.

18 Claims, 3 Drawing Sheets

FIG. 1

| TARGET ID | DATA LOCATION | REASON (FOR MONITORING PURPOSES) |
|---|---|---|
| DISK_1 | LBA_XXX1 | READ MISS |
| DISK_1 | LBA_XXX5 | CORRUPT SECTORS (FROM SMART TABLE) |
| DISK_1 | LBA_XXX7 | READ MISS |
| DISK_1 | LBA_XXX35 | DATA WRITTEN BEFORE OR AFTER POWER OUTAGE |
| DISK_1 | LBA_XXX49 | LBA LIKELY TO HAVE CORRUPT DATA (INFO FROM DRIVE FAILURE PATTERN) |
| DISK_2 | LBA_XXX72 | LIKELY TO HAVE CORRUPT DATA DUE TO POWER OUTAGE DURING WRITE |
| ... | ... | ... |

HEURISTIC APPROACH FOR FASTER CONSISTENCY CHECK IN A REDUNDANT STORAGE SYSTEM

BACKGROUND

As is well known, RAID (redundant array of independent (or inexpensive) disks) is a storage technology employed by many data storage systems which combines multiple disk drive components into a logical unit. Data is distributed across the multiple drives in one of several ways, generally referred to as "RAID levels," depending on what level of redundancy and performance (e.g., in the form of parallel computing) is required.

In RAID system configurations, consistency check (CC) is an important feature which synchronizes and corrects data between a primary drive, also referred to as a protected volume, and one or more secondary (i.e., redundant) drives, also referred to as replica volumes. As part of the synchronization process, a consistency check performs block-by-block verification to ensure that all the data on a replica volume is consistent with the data on the protected volume.

Consistency check is typically achieved by transferring the data stored on a protected volume to an internal buffer and then comparing it with data stored on the replica volume. This procedure is time consuming since each time consistency check is initiated, data comparison is performed on all sectors. When inconsistent data is found, there is also time required to correct the data. Moreover, the time taken to perform consistency check is directly proportional to the storage capacity of the drives; the larger the drives, the longer the amount of time required. With the continual push for increased data storage capacity (the size of modern disk drives exceeding two terabytes), the amount of time required to perform consistency check can significantly impact input/output (I/O) performance in the system.

SUMMARY

Embodiments of the invention are broadly related to techniques for reducing the amount of time necessary for performing consistency check in a redundant storage system, such as, but not limited to, a RAID system. To accomplish this, embodiments of the invention utilize an information repository associated with each drive for tracking I/O failures on the drives. This information repository is then used for narrowing the consistency check to only those regions of the drives that have a high likelihood of containing inconsistent data based on the information in the repository, thereby beneficially reducing the time for performing consistency checking.

In accordance with an embodiment of the invention, a method for reducing an amount of time required for performing consistency checking in a redundant storage system includes the steps of: providing an information repository associated with each of a primary drive and at least one redundant drive; storing, in the information repository, information relating to input/output failures on the primary drive and redundant drive; determining a likelihood that one or more regions of the primary drive and/or redundant drive contains inconsistent data as a function of the information stored in the information repository; and performing consistency checking on the one or more regions of the primary drive and the redundant drive determined to have at least a prescribed likelihood of containing inconsistent data to thereby reduce the amount of time required for performing consistency checking.

In accordance with another embodiment of the invention, an apparatus for reducing an amount of time required for performing consistency checking in a redundant storage system including a primary drive and at least one redundant drive, includes an information repository associated with each of the primary drive and at least one redundant drive. The information repository is operative to store information relating to input/output failures on the primary drive and/or the redundant drive. The apparatus further includes a monitoring module operative to determine a likelihood that one or more regions of the primary drive and/or the redundant drive contains inconsistent data as a function of the information stored in the information repository. A control module included in the apparatus is operative to perform consistency checking on the one or more regions of the primary drive and/or the redundant drive determined to have at least the prescribed likelihood of containing inconsistent data to thereby reduce the amount of time required for performing consistency checking.

A redundant storage system according to an embodiment of the invention includes a primary drive, at least one redundant drive configured to mirror data stored on the primary drive, and an information repository associated with each of the primary drive and the redundant drive. The information repository is operative to store information relating to input/output failures on the primary drive and/or the redundant drive. The system further includes a monitoring module operative to determine a likelihood that one or more regions of the primary drive and/or the redundant drive contains inconsistent data as a function of the information stored in the information repository. A control module included in the system is operative to perform consistency checking on the one or more regions of the primary drive and/or the redundant drive determined to have at least a prescribed likelihood of containing inconsistent data to thereby reduce the amount of time required for performing consistency checking.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 1 conceptually depicts an exemplary consistency check table, according to an embodiment of the invention;

Figure 2:
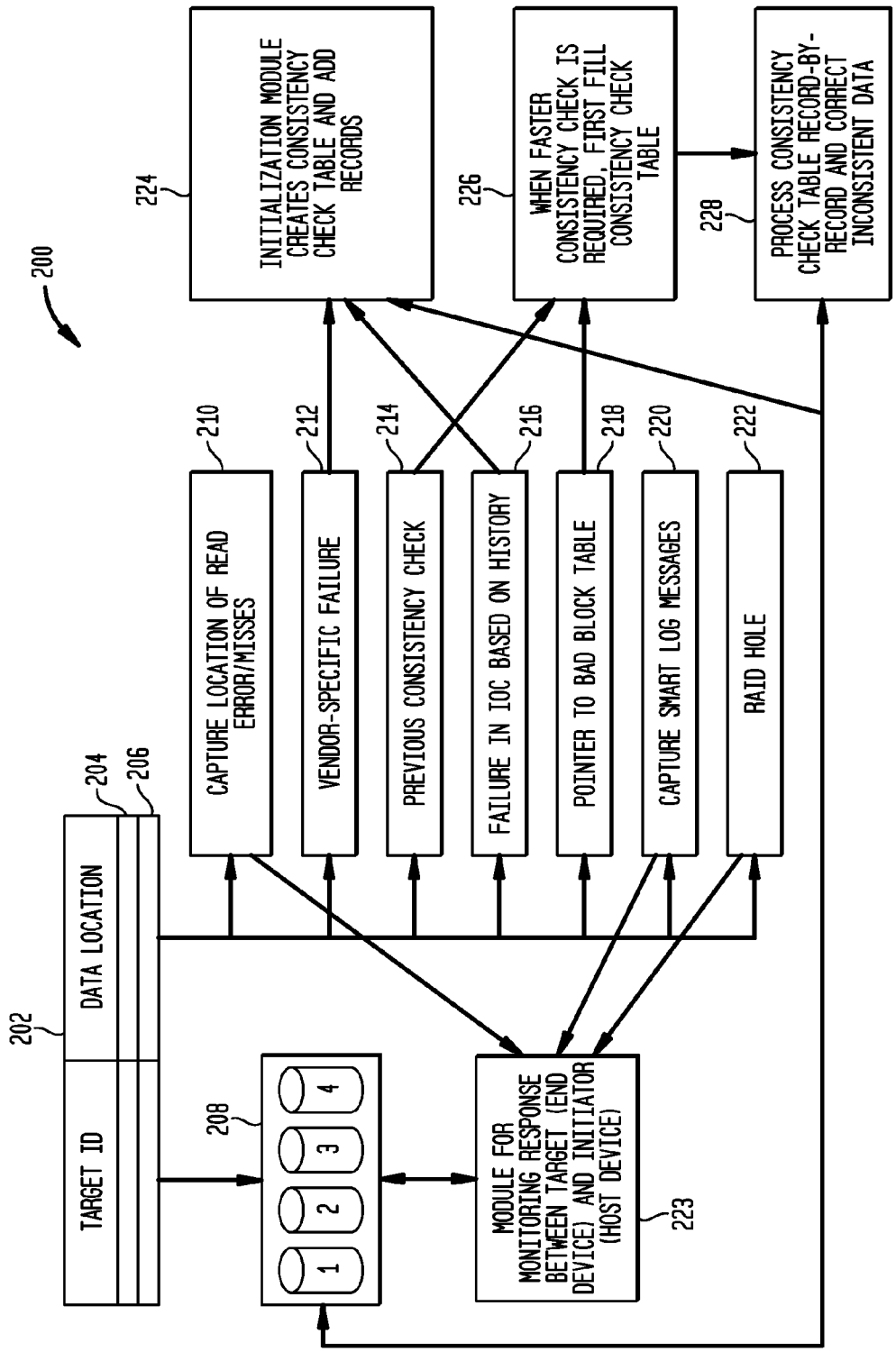
FIG. 2 is a data flow diagram conceptually depicting at least a portion of an exemplary method for generating a consistency check table, according to embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative methods and apparatus which involve generating a table comprising history and/or experience information for maintaining a list of sectors that are most likely to have inconsistent data to thereby improve consistency checking (CC). It should be understood, however, that embodiments of the invention are not limited to these or any other particular methods or apparatus. Rather, embodiments of the invention are more broadly related to techniques for tracking one or more reliability characteristics associated with at least one disk drive and utilizing these reliability characteristics to reduce the time required to perform CC, among other benefits. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

As a preliminary matter, for the purposes of clarifying and describing embodiments of the invention, the following table provides a summary of certain acronyms and their corresponding definitions, as the terms are used herein:

Table of Acronym Definitions

| Acronym | Definition |
| --- | --- |
| ASC | Additional sense code |
| BBT | Bad block table |
| CC | Consistency check or consistency checking |
| CRC | Cyclic redundancy check |
| HDD | Hard disk drive |
| I²C | Inter-integrated circuit |
| I/O | Input/output |
| IOC | Input/output controller |
| LBA | Logical block addressing |
| NVSRAM | Non-volatile static random access memory |
| PBSRAM | Pipelined burst static random access memory |
| PCI | Peripheral component interface |
| RAID | Redundant array of independent (or inexpensive) disks |
| SAS | Serial-Attached SCSI |
| SATA | Serial Advanced Technology Attachment |
| SCSI | Small Computer System Interface |
| SMART | Self-Monitoring, Analysis and Reporting Technology |
| HBA | Host bus adapter |

As previously stated, CC provides a means for synchronizing and correcting data between a protected volume and one or more replica volumes. By way of illustration, in a system with parity checking, CC may involve computing the parity of the data drive(s) and comparing the results to the contents of the parity drive. When a data miscompare is detected during CC, CC will make the inconsistent data unavailable using one or more methods. For example, if the volume drives support a WRITE LONG command, sectors with inconsistent data will be made unavailable by marking them with an uncorrectable error. If the WRITE LONG command is not supported on the volume drives, the sectors with inconsistent data are logged in a bad block table (BBT). In addition, CC will generate an entry in a firmware log for each sector that has a miscompare. CC will continue until (i) it validates the entire volume, (ii) the volume becomes less optimal, or (iii) the BBT is full. Once the BBT becomes full, the volume (e.g., RAID 0, RAID 1, RAID 10, etc.) enters into a permanently degraded state.

CC typically requires the volume to be in a known state before it can be run. Therefore, the volume should be in an optimal state and background initialization should be complete. This ensures that the data is the same on all primary and secondary volume sets (i.e., drives). The term "optimal" as used herein is intended to refer broadly to a condition where all member drives of the RAID volume are present and functional. Thus, for example, a RAID 1 volume is considered optimal when both drives are present and data on both drives are the same. In some embodiments, if the redundant volume is degraded or failed during the course of CC, the CC is cancelled. The user would then initiate a new CC once the volume becomes optimal again.

Information relating to the progress of CC on a given volume may be stored, such as in nonvolatile static random access memory (NVSRAM), or alternative persistent storage. In this manner, if the system is interrupted (e.g., the system is rebooted or a chip reset occurs) during CC, CC will continue from where it left off. A bit can be set in RAID Volume Page 0 indicating that CC is in progress or pending, although alternative means for marking the progress or status of CC are contemplated, as will become apparent to those skilled in the art given the teachings herein.

In accordance with an exemplary standard CC comparison methodology, a read to a primary hard disk drive (HDD) is issued to determine a maximum number of sectors or a block limit size, whichever is smaller, that can be transferred into an internal buffer. Next, a VERIFY command is issued to a secondary HDD at the location of the redundant data with a BYTCHK bit set to one. The VERIFY command requests verification of data written on the media. In the context of an illustrative device, LSISS2520/LSISS2530 (commercially available from LSI Corporation), a verification length of 0 indicates that no data is transferred on the media starting at the specified logical block address (LBA). The BYTCHK bit being set to 0 indicates that after writing, the secondary HDD performs a medium verification with no data comparison. The BYTCHK bit being set to 1 specifies that, after writing, the secondary HDD performs a cyclic redundancy check (CRC) comparison of data written on the medium with the data just written. If the comparison is unsuccessful (i.e., miscompares) for any reason, the secondary HDD returns a CHECK CONDITION status with the sense key set to MISCOMPARE and with the appropriate additional sense code (ASC) for the condition. Appropriate logging and recovery are performed. If a "good" status is returned, the CC can move on to the next segment. One disadvantage of this approach, however, is that the CC takes a significant amount of time (e.g., an hour or more, depending on memory storage capacity of the HDD), irrespective of the actual errors, since the data from all the sectors is checked and inconsistencies corrected.

Advantageously, embodiments of the invention reduce the amount of time required for performing CC in a redundant storage system. To accomplish this, embodiments of the invention provide a mechanism for compiling information which is used to assess a status of a protected volume (i.e., medium) and determining, based on the compiled information, a likelihood that a given sector or other region of the protected volume contains inconsistent data. When CC is initiated, only those regions of the volume having at least a prescribed probability of containing inconsistent data are checked (i.e., verified). In this manner, CC on the entire volume can be avoided, thus significantly reducing the time otherwise necessary to perform CC compared to standard approaches.

In accordance with an illustrative embodiment of the invention, a history and/or experienced-based table or alternative information repository is generated which includes information regarding I/O failures corresponding to the primary and secondary volumes. For example, a list of sectors associated with a given volume that are most likely to have inconsistent data may be stored in the table. The information included in the table can be based on, among other factors, an analysis of one or more events, historical data, failure patterns, drive performance and environmental characteristics (e.g., speed, temperature, noise level, read/write errors, etc.), reliability factors, etc., including, but not limited to, one or more of the following:

- Information on specific drive LBAs that have encountered read errors (e.g., read misses) in case of redundant volumes.
- Information from a self-monitoring, analysis and reporting technology (SMART) tool indicating bad block entries associated with a given drive. SMART is a monitoring tool for hard disk drives to detect and report on whether or not a prescribed threshold is exceeded. A "threshold exceeded" value is indicative that there is a relatively high probability that the drive will not be able to meet a prescribed specification (e.g., ability to write certain sectors, drive speed, temperature, noise level, vibration level, etc.) in the future; that is, the drive is likely to fail.
- Information relating to failure patterns on drives. This information can be inferred from vendor-specific failure patterns.
- Information from previous CCs, where inconsistent data has been encountered.
- Information relating to failure patterns on a RAID controller. By analyzing failure patterns on the RAID controller, inconsistency in writes can be predicted to a great extent. This information can also be stored in a CC table.
- Information regarding data writes occurring proximal in time to power outages (e.g., time stamp).

Each volume (primary volume and secondary volume(s)) can have its own table associated therewith or, alternatively, a central (i.e., global) table may be maintained which includes information relating to each of the volumes. CC according to embodiments of the invention is performed by utilizing the respective table or tables associated with the volumes as input for fixing those records which are likely to contain inconsistent data, thus eliminating a need to perform CC on all sectors of each volume.

By way of illustration only and without loss of generality, FIG. 1 conceptually depicts an exemplary consistency check table 100, according to an embodiment of the invention. The table 100 is organized into three columns; namely, target identification (ID), data location, and reason (used for monitoring purposes only). The target ID column indicates a particular volume (i.e., disk) and the data location column indicates a corresponding logical block address on the disk where there is a high likelihood of inconsistent data. The reason column is used, in this illustration, for monitoring purposes to indicate a basis for concluding why the corresponding data location is believed to contain inconsistent data. It is to be appreciated that embodiments of the invention are not limited to any specific organization of the CC table or information stored therein.

In one embodiment, the CC table 100 is stored as metadata in each physical disk and loaded into NVSRAM as well. This allows the table to move with each physical device, as in the case of a removable drive for example, without loss of the contents therein. An entry in the CC table 100 will be cleared when the associated region of the target disk is successfully written. Whenever there is a desire to perform faster CC, the controller will utilize the table 100 as input to fix only those records which are included in the table.

Specifically, with reference to table 100, a first entry (i.e., table row) indicates that a read miss occurred at data location LBA_XXX1 on disk_1. A second entry in table 100 indicates that corrupt sectors were detected, using SMART table information, at data location LBA_XXX5 on disk_1. A third entry in table 100 indicates that a read miss occurred at data location LBA_XXX7 on disk_1. A fourth entry in table 100 indicates that data at location LBA_XXX35 on disk_1 was written before or after a detected power outage (which can be determined, for example, using a time stamp or alternative mechanism) and is therefore likely to be inconsistent. A fifth entry in table 100 indicates that data location LBA_XXX49 on disk_1 is likely to contain corrupt data based, at least in part, on an analysis of drive failure pattern information (which can be inferred, for example, from manufacturer testing data, etc.). A sixth entry in table 100 indicates that data at location LBA_XXX72 on disk_2 is likely to be corrupt, since it was written during a detected power outage (which can be determined, for example, using a time stamp or alternative mechanism).

A negative response, such as, for example, one or more of the reasons indicated in table 100, received from an end device (e.g., drive) is analyzed to determine whether the failure is the result of inconsistent data. In table 100, the shaded entries, i.e., entries 2, 4 and 5, indicate that locations LBA_XXX5, LBA_XXX35 and LBA_XXX49, respectively, contain inconsistent data. Consequently, when CC is performed, the table 100 is periodically scanned and taken as input, and any data inconsistencies at those noted locations are corrected.

FIG. 2 is a data flow diagram conceptually depicting at least a portion of an exemplary method 200 for generating a CC table, according to embodiment of the invention. As apparent from FIG. 2, a CC table 202 is organized into a plurality of entries, 204 and 206, each entry associating a target ID, indicative of a given one of a plurality of HDD (e.g., disks 1 through 4) in a RAID unit 208, with a corresponding data location (e.g., logical block address). The identification of a particular data location as having a high likelihood of containing inconsistent data may be based on, among other factors, an analysis of one or more events, historical data, device failure patterns, drive performance and environmental characteristics (e.g., speed, temperature, noise level, read/write errors, etc.), reliability factors, etc., as previously stated. Some of the information used to generate the consistency check table 202, in this embodiment, includes capturing the location of read errors and/or read misses 210, analysis of vendor-specific failures 212, previous (i.e., historical) CC information 214, failures in I/O controller (IOC) based on historical information 216, pointer to a BBT 218, capturing SMART log messages 220, and RAID hole information 222, among other factors.

A monitoring module 223 is operative to monitor responses between a target (i.e., end device) and an initiator (i.e., host device). Accordingly, certain information, such as, for example, the location of read errors/read misses 210, SMART log messages 220 and RAID hole information 222 used to generate the CC table 202 may also be used by the monitoring module 223. Every response from the target device to the initiator device will, according to embodiments of the invention, pass through monitoring module 223. And when a response is detected which matches one of the reasons stored in the CC table 202 (see, e.g., CC table 100 in FIG. 1), further action is taken based on the response. Such further action(s) taken are indicated by modules 224, 226 and 228, in this illustrative embodiment, which will be described in further detail below. It is to be understood, however, that embodiments of the invention are not limited to the specific actions shown.

An initialization module 224 is operative to construct the CC table 202 and to add records (i.e., entries) to the table as a function of prescribed criteria. Records can be added based at least in part on user input or as part of a firmware upgrade, or alternative criteria. For example, based on vendor-specific failure patterns and/or historical failures in the IOC, initialization module 224 will fill the CC table. Records may be added to the CC table 202 based on other factors, an analysis of one or more events, historical data, device failure patterns, drive performance and environmental characteristics (e.g., speed, temperature, noise level, read/write errors, etc.), reliability factors, etc., including, for example, vendor-specific failure data 212, IOC failure history data 216, or performance information obtained from the RAID unit 208.

When faster CC is required or desired, the CC table 202 is filled in step 226. Information included in the CC table 202 is then used in step 228, record-by-record, to correct inconsistent data detected at the data locations indicated in the table for each corresponding disk in the RAID unit 208.

At least a portion of the illustrative methodology 200 shown in FIG. 2 may be implemented in a RAID controller, or an alternative controller. In terms of operation, according to embodiments of the invention, each time there is a read error or read miss, the specific LBA location of the error/miss is stored in the CC table 202. Another set of entries in table 202 may comprise failure patterns of the vendor-specific drives. Vendor-specific failure patterns are generally static in nature and are not calculated by the RAID controller. A list of miscompare information from previous CC operations (i.e., historical data inconsistencies) can be obtained and stored as entries in the table 202. By maintaining a history of failures on RAID controllers, a heuristic approach can be performed to determine failure patterns, based on logs and/or other reliability information, and such failure pattern analysis can be used to populate the table 202. In some cases of RAID operation, a write hole (also referred to herein as a "RAID hole") may occur before, during, or after a power interruption, which can lead to data inconsistency. The location of the suspected inconsistency is then stored in the CC table 202. Embodiments of the invention monitor sectors which are accessed more during I/O proximate in time to the power interruption and CC is performed only on those sectors which are determined to be more prone to the write hole.

Figure 3:
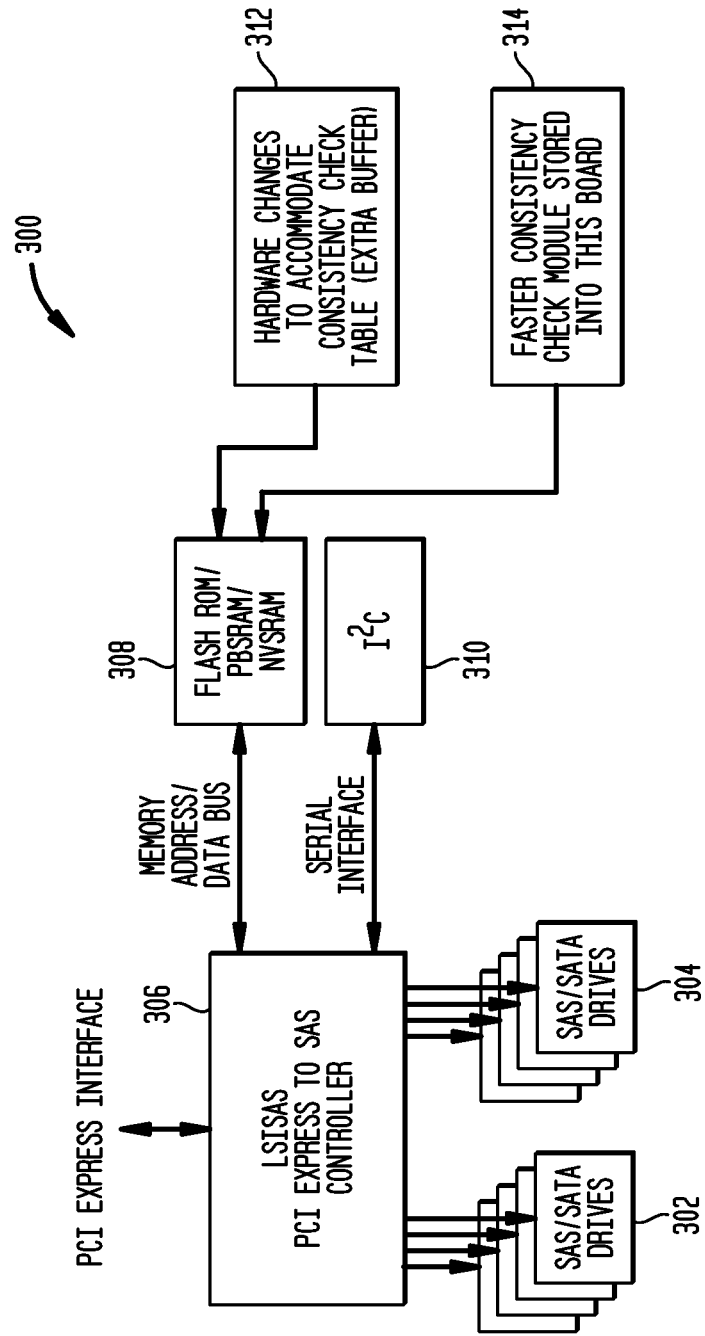
FIG. 3 is a block diagram depicting at least a portion of an exemplary electronic system adapted to reduce the time required for performing consistency checking, according to an embodiment of the invention.

FIG. 3 is a block diagram depicting at least a portion of an exemplary electronic system 300 adapted to reduce the time required for performing CC, according to an embodiment of the invention. The system 300 represents an exemplary implementation of a controller card. With reference to FIG. 3, system 300 includes a plurality of HDDs, such as, for example, a first set of drives 302 (e.g., Serial-Attached SCSI (SAS)/Serial Advanced Technology Attachment (SATA) drives) and a second set of drives 304 (e.g., SAS/SATA drives), coupled with a controller 306, which in this illustrative embodiment comprises a peripheral component interface (PCI) express to SAS controller (e.g., LSI SAS Controller series, commercially available from LSI Corporation). While reference is made herein to SAS/SATA drives, it is to be understood that embodiments of the invention are not limited to any specific drive type or protocol. Furthermore, although the controller 306 in this illustrative embodiment is operative to communicate between a PCI Express bus and SAS/SATA drives, embodiments of the invention are not limited to use with any specific bus type or protocol and/or any specific drive type or protocol. The first and second sets of drives 302 and 304, respectively, need not be the same types of drives. One or both sets of drives 302 and 304 are preferably operative as redundant storage devices.

The system 300 further includes memory 308, such as, for example, flash read-only memory (ROM), pipelined burst static random access memory (PBSRAM), and/or NVSRAM, coupled with the controller 306 via a memory address/data bus, or an alternative communication means. An inter-integrated circuit ($I^2C$) device 310 is coupled with the controller 306 via a serial bus. The $I^2C$ device 310 is used, in this example, for accessing the controller using a serial interface, or an alternative communication means.

In implementing at least portions of embodiments of the invention, certain hardware modifications 312 to the memory 308 are performed. For example, to accommodate the CC table (e.g., table 202 in FIG. 2), additional NVSRAM may be included in memory 308 for use as a buffer during CC. An enhanced CC module 314 is also included in system 300. In accordance with embodiments of the invention, the hardware modifications 312 and enhanced CC module 314 are incorporated into the memory 308, although according to other embodiments, the hardware modifications 312 (e.g., in the form of additional NVSRAM) and/or the enhanced CC module 314 may reside external to the memory 308. It is to be appreciated that the illustrative modules shown in FIG. 2 are incorporated into one or both of the hardware modifications 312 and CC module 314 depicted in FIG. 3. Hardware modifications 312 and CC module 314 can be part of a host bus adapted (HBA) or individual drives, according to embodiments of the invention.

At least a portion of the embodiments of the invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with embodiments of the invention can be employed in essentially any application and/or electronic system in which ensuring data integrity is desired. Suitable applications and systems for implementing techniques according to embodiments of the invention may include, but are not limited to, redundant storage systems, such as, for example, a RAID system. Systems incorporating such integrated circuits are considered part of embodiments of the invention. Given the teachings of embodiments of the invention provided herein, one of ordinary skill in the art will be able to contemplate other implementations and applications of the techniques of embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the inventive subject matter are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for reducing an amount of time required for performing consistency checking in a redundant storage system including a primary drive and at least one redundant drive, the method comprising steps of:
    providing an information repository associated with each of the primary drive and at least one redundant drive;
    storing, in said information repository, information relating to input/output failures on the primary drive and the at least one redundant drive;
    determining a likelihood that one or more regions of at least one of the primary drive and the at least one redundant drive contains inconsistent data as a function of the information stored in said information repository; and
    performing consistency checking on the one or more regions of at least one of the primary drive and the at least one redundant drive determined to have at least a prescribed likelihood of containing inconsistent data to thereby reduce the amount of time required for performing consistency checking;
    wherein the step of determining the likelihood that one or more regions of at least one of the primary drive and the at least one redundant drive contains inconsistent data comprises monitoring one or more responses between a target device and an initiator device, and when a given one of the responses matches at least one entry in the information repository, initiating a prescribed action based on the given one of the responses.

2. The method of claim 1, wherein the step of providing an information repository comprises constructing a consistency check table for each of the primary drive and at least one redundant drive, the table including information regarding input/output failures corresponding to the primary drive and the at least one redundant drive.

3. The method of claim 2, wherein the information regarding input/output failures is based on at least one of an analysis of one or more failure events corresponding to at least one of the primary drive and the at least one redundant drive, historical failure data corresponding to at least one of the primary drive and the at least one redundant drive, failure patterns corresponding to at least one of the primary drive and the at least one redundant drive, drive performance and environmental characteristics corresponding to at least one of the primary drive and the at least one redundant drive, and reliability factors corresponding to at least one of the primary drive and the at least one redundant drive.

4. The method of claim 2, wherein the consistency check table comprises a list of sectors associated with at least one of the primary drive and the at least one redundant drive that are most likely to have inconsistent data.

5. The method of claim 2, wherein constructing the consistency check table comprises storing a location associated with a given region of at least one of the primary drive and the at least one redundant drive having at least a prescribed likelihood of having inconsistent data.

6. The method of claim 1, wherein the step of providing the information repository comprises storing the information as metadata on each of the primary drive and at least one redundant drive.

7. The method of claim 1, further comprising clearing an entry in the information repository when an associated region of at least one of the primary drive and the at least one redundant drive corresponding to the entry is successfully written.

8. An apparatus for reducing an amount of time required for performing consistency checking in a redundant storage system including a primary drive and at least one redundant drive, the apparatus comprising:
    an information repository associated with each of the primary drive and the at least one redundant drive, the information repository being configured to store information relating to input/output failures on the primary drive and the at least one redundant drive;
    a monitoring module configured: to determine a likelihood that one or more regions of at least one of the primary drive and the at least one redundant drive contains inconsistent data as a function of the information stored in the information repository; to monitor one or more responses between a target device and an initiator device; and, when a given one of the responses matches at least one entry in the information repository, to initiate a prescribed action based on the given one of the responses; and
    a control module configured to perform consistency checking on the one or more regions of at least one of the primary drive and the at least one redundant drive determined to have at least the prescribed likelihood of containing inconsistent data to thereby reduce the amount of time required for performing consistency checking.

9. The apparatus of claim 8, wherein the information repository comprises a consistency check table for each of the primary drive and the at least one redundant drive, the table including information regarding input/output failures corresponding to the primary drive and the at least one redundant drive.

10. The apparatus of claim 9, further comprising an initialization module operative to construct the consistency check table and to add one or more entries to the table as a function of prescribed criteria.

11. The apparatus of claim 9, wherein the information regarding input/output failures is based on at least one of an analysis of one or more failure events corresponding to at least one of the primary drive and the at least one redundant drive, historical failure data corresponding to at least one of the primary drive and the at least one redundant drive, failure patterns corresponding to at least one of the primary drive and the at least one redundant drive, drive performance and environmental characteristics corresponding to at least one of the primary drive and the at least one redundant drive, and reliability factors corresponding to at least one of the primary drive and the at least one redundant drive.

12. The apparatus of claim 9, wherein the consistency check table comprises a list of sectors associated with at least one of the primary drive and the at least one redundant drive that are most likely to have inconsistent data.

13. The apparatus of claim 9, wherein the consistency check table comprises a location corresponding to a given region of at least one of the primary drive and the at least one redundant drive having at least a prescribed likelihood of having inconsistent data.

14. The apparatus of claim 8, wherein the information in the information repository is stored as metadata on each of the primary drive and at least one redundant drive.

15. The apparatus of claim 8, wherein the controller module is operative to clear an entry in the information repository when an associated region of at least one of the primary drive and the at least one redundant drive corresponding to the entry is successfully written.

16. The apparatus of claim 8, wherein the apparatus is fabricated in at least one integrated circuit.

17. A redundant storage system, comprising:
a primary drive;
at least one redundant drive, the at least one redundant drive being configured to mirror data stored on the primary drive;
an information repository associated with each of the primary drive and the at least one redundant drive, the information repository being configured to store information relating to input/output failures on the primary drive and at least one redundant drive;
a monitoring module configured: to determine a likelihood that one or more regions of at least one of the primary drive and the at least one redundant drive contains inconsistent data as a function of the information stored in the information repository; to monitor one or more responses between a target device and an initiator device; and, when a given one of the responses matches at least one entry in the information repository, to initiate a prescribed action based on the given one of the responses; and
a control module configured to perform consistency checking on the one or more regions of at least one of the primary drive and the at least one redundant drive determined to have at least a prescribed likelihood of containing inconsistent data to thereby reduce the amount of time required for performing consistency checking.

18. The system of claim 17, wherein the information repository comprises a consistency check table for each of the primary drive and the at least one redundant drive, the table including information regarding input/output failures corresponding to the primary drive and the at least one redundant drive.

* * * * *